United States Patent [19]
Hönig et al.

[11] Patent Number: 4,718,389
[45] Date of Patent: * Jan. 12, 1988

[54] APPARATUS FOR THE CONTROL OF REPETITIVE EVENTS DEPENDENT ON OPERATING PARAMETERS OF INTERNAL COMBUSTION ENGINES

[75] Inventors: Günther Hönig, Ditzingen; Uwe Kiencke, Ludwigsburg; Alfred Schulz, Oberriexingen, all of Fed. Rep. of Germany

[73] Assignee: Robert Bosch GmbH, Stuttgart, Fed. Rep. of Germany

[*] Notice: The portion of the term of this patent subsequent to Jul. 12, 2003 has been disclaimed.

[21] Appl. No.: 423,051

[22] Filed: Sep. 24, 1982

Related U.S. Application Data

[63] Continuation of Ser. No. 196,914, May 5, 1980, U.S. Patent No. 4,414,949

[30] Foreign Application Priority Data

Sep. 5, 1978 [DE] Fed. Rep. of Germany ....... 2838619

[51] Int. Cl.⁴ .................................................. F02B 3/00
[52] U.S. Cl. ..................................... 123/479; 371/62; 364/187
[58] Field of Search ............... 123/479, 359, 399, 397, 123/351; 371/62; 364/185, 186, 187, 184, 431.11

[56] References Cited

U.S. PATENT DOCUMENTS

| 3,191,153 | 6/1965 | Bratschi | 371/62 |
|---|---|---|---|
| 3,745,529 | 7/1973 | Engle | 371/62 |
| 3,834,361 | 6/1974 | Keely | 123/479 |
| 3,875,390 | 4/1975 | Eccles | 364/187 |
| 3,908,117 | 9/1975 | Naruse | 371/62 |
| 3,919,533 | 11/1975 | Einolf | 371/62 |
| 3,964,020 | 6/1976 | Dickerson | 364/186 |
| 4,049,957 | 9/1977 | Kera | . |
| 4,198,678 | 4/1980 | Maatje | 364/187 |
| 4,244,340 | 1/1981 | Herth | . |
| 4,245,315 | 1/1981 | Barman | . |

FOREIGN PATENT DOCUMENTS 2246426 4/1973 Fed. Rep. of Germany ........ 371/62

Primary Examiner—Ronald B. Cox
Attorney, Agent, or Firm—Frishauf, Holtz, Goodman & Woodward

[57] ABSTRACT

Control signals for triggering the events to be controlled, via at least one output stage (13, 14), are generated in a vehicular computer (11) as a dependent function of the output signals of a sensor (10) coupled to a rotating shaft of the engine, and of further sensors dependent on other operating parameters. At least one sensor-controlled auxiliary control device (17, 18) is provided. The output signals of the auxiliary control devices (17, 18) are transmitted via a switching device (12) to the terminal control stages (13, 14) as an alternative to the output signals of the computer (11). The switching device (12) is preferably embodied as a multiplexer and is controllable by an error decoding stage (19) for decoding and monitoring serial, or parallel, signals of the computer (11) to determine proper function of the computer (11); in case of malfunction of the computer (11), decoding stage (19) causes control of the output stage, or stages (13, 14) from the respective auxiliary control device.

12 Claims, 4 Drawing Figures

APPARATUS FOR THE CONTROL OF REPETITIVE EVENTS DEPENDENT ON OPERATING PARAMETERS OF INTERNAL COMBUSTION ENGINES

This is a continuation of application Ser. No. 196,914 filed May 5, 1980, now U.S. Pat. No. 4,414,949.

The invention relates to an apparatus for the control of repetitive events dependent on the operating parameters of combustion engines, especially for automotive use. Typical controlled events are ignition, fuel injection, transmission shifting.

BACKGROUND

Programmable or non-programmable computer apparatus to control operating events in vehicles and engines therefor are well known, for example from the W. German Pat. No. 2,504,843 (to which U.S. Pat. No. 4,063,539 corresponds), the W. German published application DE-OS No. 25 39 113 and the W. German published application DE-OS No. 2,655,948 (to which U.S. Pat. No. 4,174,688 corresponds). Such computers, having many components, have complex structures and hence are subject to a variety of possibilities for error. An error which, in itself, is insignificant can nevertheless lead to the breakdown of the system to be controlled, and can immobilize the internal combustion engine, or the vehicle driven by the engine.

THE INVENTION

It is an object to provide a system which detects errors in the operation of computers, and particularly on-board vehicular computers and, upon detection of such errors, causes transfer of operation from computer control of the internal combustion engine of the vehicle so that total breakdown of the vehicle will not result; continued operation will, at least, permit driving the vehicle to a repair station.

Briefly, an on-board vehicle computer is provided, connected to receive input data from a sensor coupled to the crankshaft of an engine and, if desired, additional input data relating to operating parameters of the engine, such as temperature, pressure, and the like, in short, to receive operating signals. The computer processes these operating signals in accordance with a program stored therein to provide output signals to control at least one of: ignition events, fuel injection events and, if desired, gear shifting and the like. The system, additionally, includes an auxiliary ignition and, if provided, an auxiliary fuel injection control apparatus, merely connected to the speed transducer. In the most simple form, the speed transducer can be breaker points of an ignition system, or may be a non-contacting ignition system transducer. The auxiliary control units provide output signals to a transfer switch which transfers the signals from the auxiliary unit to the respective ignition or fuel injection output stages, for example to the ignition coil, rather than the output signals from the on-board vehicle computer, if a malfunction in the computer is being sensed. Malfunction in the computer is sensed in an error decoding state which includes a logic circuit testing the signal output from the computer with respect to a built-in logic andd determining if the signal output from the computer meets certain predetermined criteria. If it does, the transfer switch is set in "normal" position, and the computer controls operation of the respective output units, such as an ignition system, an automatic gear change system, or the like. If, however, deviation of the signals from the computer with respect to the criteria stored in the error decoding stage is sensed, the switch transfers control of the ignition and/or fuel injection system over to the auxiliary control units to permit continued operation although not as finely tuned as provided by the on-board vehicle computer. Yet, the continued operation permits the user to continue to operate the vehicle and, if necessary, drive to a repair or service station. Malfunction of the computer is also indicated in an indicator.

The error decoding stage may have certain hierarchies of detection—for example to detect serious errors which will definitely and grossly interfere with vehicle operation—in which case the switch-over from the auxiliary control system is commanded; or to detect lesser errors, only affecting, for example, most efficient operation, in which case no switch-over is controlled but only an indication of the error detection is provided, in order to warn the driver that the vehicle or the engine is not operating under intended and optimum conditions but, rather, that a malfunction has occurred.

The apparatus according to the invention, with the distinguishing features of the main claim, has the relative advantage that even upon breakdown of the computer, essential functions are maintained to such an extent that the operation of the internal combustion engine or, respectively, of the vehicle, is still possible.

The apparatus according to the invention can be constructed with few components, or the functions may even be integrated within the computer.

Especially safe error recognition is achieved by constructing the error decoding stage, connected to the computer for the serial decoding of signal sequences, as a register; the register contents are periodically interrogated. Error annunciation and no-error annunciation, are realized by means of coded serial signal trains, resulting in maximum reliability in error recognition. Preferably, a multiplexer serves as the switching device to switch from the computer to the auxiliary control device. Upon recognition of an error, an indicator device is activated; this forms a further refinement of the invention.

DRAWING

FIG. 1: A block circuit diagram of a first exemplary embodiment utilizing serial decoding;

FIG. 1a: A fragmentary diagram of the circuit of FIG. 1 and illustrating parallel decoding;

FIG. 2: A refinement of an error decoding stage, and;

in FIG. 3: A signal diagram illustrating the functioning of the circuit depicted in FIG. 2.

DESCRIPTION OF THE EXEMPLARY EMBODIMENT

Figure 1:
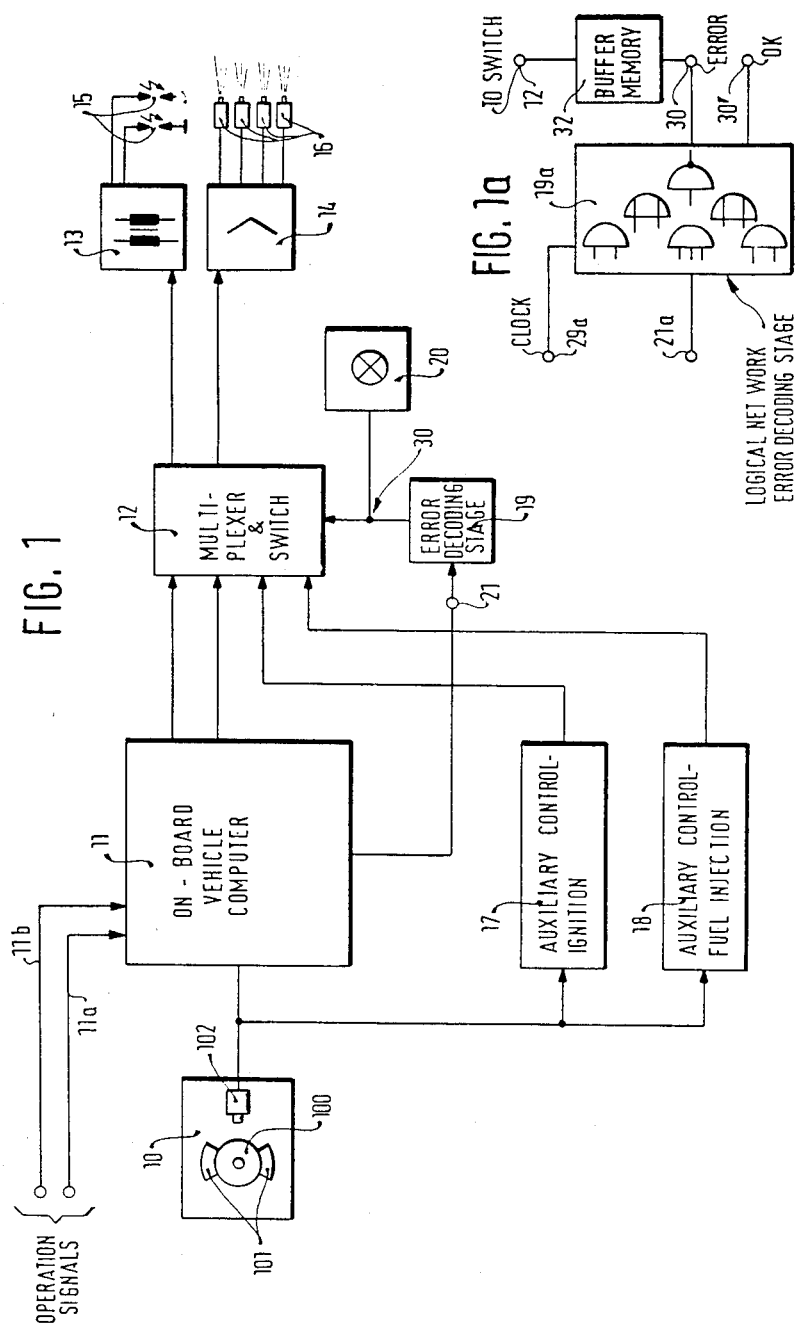

In the exemplary embodiment depicted in FIG. 1, a sensor 10 is connected to a computer 11. Such a sensor installation 10 commonly consists of a sensor disk 100 preferably coupled to the crankshaft of an internal combustion engine. Reference marks 101 are affixed to the sensor disk 100 and pass a receiver or pick-up 102 where they generate a signal serving for the transmission of speed information and of angular position information. The generation of such a signal can take place inductively, optically, or by means of the Hall effect or of the Wiegand effect. The signal from pick-up 102 is connected to a computer 11. The computer 11 itself can be constructed as a hardwired (non-programmable) computer or as a programmed computer. Additional sensing inputs 11a, 11b supply operation signals, like load, pressure (see, for example, the referenced U.S. Pat. No. 4,063,539). Two control outputs of the computer 11 are connected to two terminal or output control stages 13, 14 via a switching device 12 embodied, for example, as a multiplexer. A suitable multiplexer is, available commercially, e.g. as integrated circuit (IC) type 4016. The terminal control stage 13 is shown as an ignition stage. Commonly, it has an ignition coil, whose primary circuit contains a switching transistor and whose secondary circuit contains at least one spark plug 15. The terminal control stage 14 is shown as a fuel injection stage which controls fuel injection processes. This stage 15 includes, essentially an amplifier stage controlling injection valves 16. A system 10 to 16—with the exception of the switching device 12—is known from the prior art cited above, and is described there in greater detail.

Further terminal stages could also be controlled by means of the computer 11, for example, further terminal ignition stages could be employed to obtain high voltage distribution to several cylinders of an internal combustion engine without mechanically operating components. Output stages for transmission control can also be connected to the computer 11.

The output of the sensor installation 10 is further connected to the switching inputs of the switching device 12 via two auxiliary control devices 17, 18. The auxiliary control device 17 is used for emergency control of the ignition stage 13, and the auxiliary control device 18 is used for emergency control of the injection stage 14. Such auxiliary control devices can be embodied, in the simplest case, as timing elements whose holding time determines the closure time of the electrical switch for the ignition, and which determines the injection duration for fuel injection. Instead of these simplest versions, somewhat more expensive devices can also be employed to serve the emergency function, e.g. as described in the W. German publications DE OS No. 2 640 791 or DE OS No. 2 700 676 (to which U.S. Pat. Nos. 4,133,323 and 4,212,280 correspond).

The computer 11 is connected to the switching control input of the switching device 12 via an error decoding stage 19.

OPERATION

During disturbance-free operations, the switching device 12 is switched by the error decoding stage 19 so as to let the computer 11 control the terminal stage 13, 14. If an error now appears in the computer 11, resulting either in a false or absent output signal, the error decoding state 19 responds and flips the switching device 12 into its second interconnecting state, whereby the terminal stages 13, 14 are connected to the auxiliary control devices 17, 18. The indicator device 20 is actuated simultaneously. The ignition and injection processes are now being controlled by the auxiliary control devices 17, 18. This type of control may result in reduced running comfort of a motor vehicle, but will guarantee that the vehicle can proceed to a repair shop.

In place of a common switch-over of all of the control processes to the auxiliary control devices, it is possible to provide for separate switching in the sense that only the section in which a malfunction appears is switched to the auxiliary mode. Several error decoding stages would be required in that case.

For serial data admission, the error decoding stage 19 can consist, in the simplest case, of a retriggerable timing element. The computer 11 normally delivers a periodic signal train representing the correct function. The maximum length of periodic signals from computer 11 must then be shorter than the timing duration or holding time of the timing element 19, so that the timing element never flips back during normal i.e. proper operation. Only when a signal is missing, will a flip-back occur, thereby triggering the switchover to the auxiliary control device.

A parallel error signal can also be used instead of a serial error signal. In that case, the error decoding stage 19 must be constructed as a logical network 19a—see FIG. 1a, in particular as a logical gating circuit. Input is by a parallel input bus or cable 21a. In accordance with any given computer system, conditions can be set up which must appear periodically and simultaneously. When all of the conditions are met simultaneously, as determined by timing applied by clock terminal 29a, for example, at terminal 30′, an output signal which characterizes the proper functioning of the system, is produced by the logic circuitry. If one of the conditions is not met, the complementary output signal at terminal 30 characterizing an error function is produced. Such an error signal can, if necessary, be stored in a flipflop 32 serving as an intermediate memory or buffer store.

Figure 2:
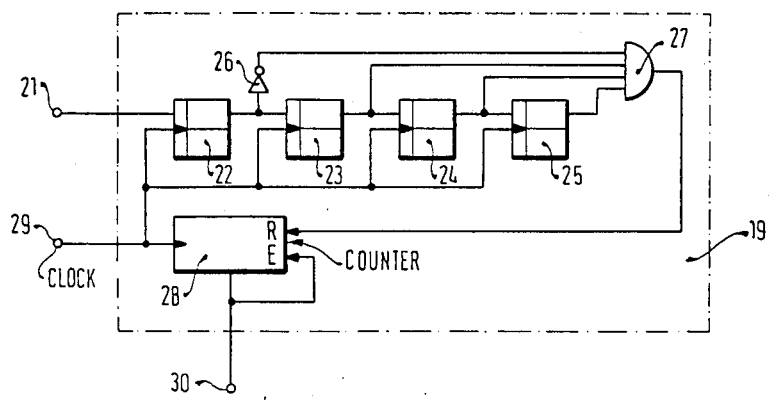

An preferred embodiment of an error decoding stage 19 for serial decoding of signal trains is shown in FIG. 2. The terminal 21 input pin of the error decoding stage 19, is connected to the output of the computer 11. The terminal 21 is connected to the input of a first flipflop 22, three further flipflops 23 to 25 are serially interconnected to the output of flipflop 22. The output of each flipflop is connected to the input of the next flipflop. The output of the flipflop 22 is further connected via an inventer 26 to the input of an AND-gate 27 whose other inputs are connected to the input of the remaining flipflops 23 to 25. The output of the AND-gate 27 is connected to the reset input R of a digital counter 28. A terminal 29 carrying a clock pulse train is connected to the clock inputs of the flipflops 22–25 and also to the clock input of the counter 28. An output of the counter 28 is connected to an output connector 30 and also to a blocking or enable input E of this counter 28.

OPERATION WITH REFERENCE TO FIG. 3

The signal identifications relate to similarly identified terminals or to outputs of similarly identified construction components.

It is assumed that the signal sequence U21 supplied by the computer 11 at terminal 21 is formed in such a way that a signal U21 is present during the occurrence of three pulses of a pulse signal U29 (see FIG. 3), and that the signal U21 is absent during the subsequent pulse signal U29. The signals U21 are shifted through the flipflops 22 and 25 at the rhythm of the pulse or clocking frequency. With each fourth pulse signal U29, an 0-signal is thus present at the output of the flipflop 22 and a 1-signal is present at the output of each of the remaining flipflops 23 to 25. The inverter 26 thus produces the AND-condition for the AND-gate 27, resulting in a reset signal U27. Hence, the counter 28 counts cyclically up to the numeral three, after which the counter 28 is reset. In that case, the third lowest output ($2^2$) is chosen as the output of the counter 28, to corresponding to a 4. Because the number four is not reached in this way, a continuous 0-signal is present at the terminal 30 causing the output stages 13, 14 (FIG. 1) to be connected to the computer 11 via the switching device 12.

Figure 3:
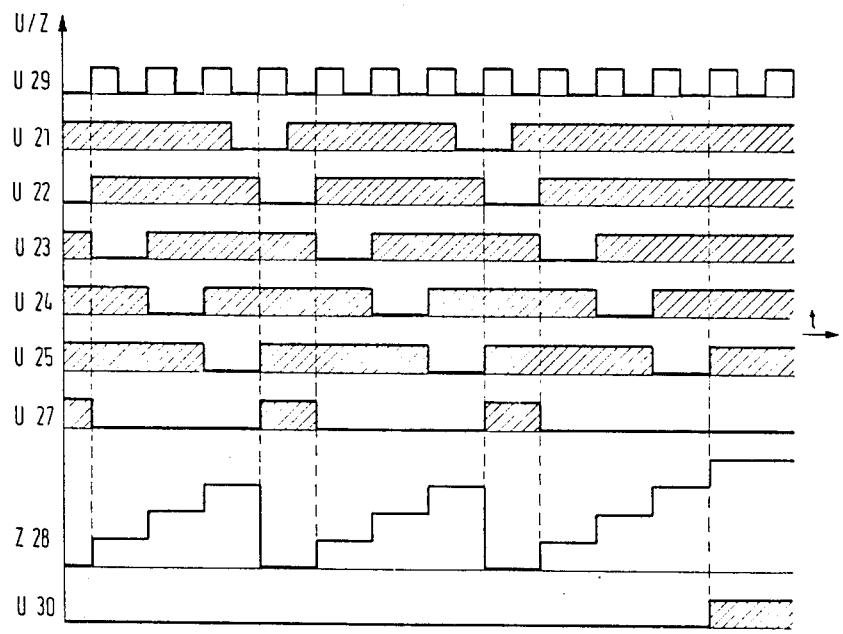

The illustration is drawn to an error in the third cycle. As illustrated in FIG. 3, and this condition is manifested by an altered signal sequence U21. For the fourth signal pulse, the AND-condition for the AND-gate 27 is not met, and no reset signal is produced for the counter 28. Therefore, the counter 28 counts to the value four, which causes a 1-signal to appear at the output terminal 30 and causes the counter 28 to be blocked by the blocking input E for any subsequent counting cycles until a reset signal once again appears. This 1-signal present at the terminal 30 is the decoded error signal which activates the switching device 12 (FIG. 1) and causes a switchover of control of the terminal stages 13, 14 from the auxiliary control stages 17, 18.

Instead of the signal sequence U21, any other suitable signal train can be accommodated, and may, if necessary, be decoded by means of longer chains of flipflops and by a correspondingly modified logical interconnection of some of the outputs.

Instead of the single monitoring function supervising operation of the computer, supplementary monitoring of further construction components can also be provided. Signals could be selected whose presence indicates a definite signal combination or a particular status in the computer. Such signals can then be linked interconnected accoring to the preceding description.

Further error decoding stages 19 can be employed to decide if the given error is serious enough to require a switchover to the emergency system provided by the auxiliary system 17, 18, or whether it is sufficient merely to indicate the error to the operator without carrying out switchover to the emergency system in switching unit 12.

We claim:

1. Apparatus for controlling repetitive events dependent upon operating parameters of a vehicular internal combustion engine, and including at least one of: ignition events; fuel injection events; transmission events, comprising
a vehicular computer (11);
means (11a, 11b) applying vehicle operation signals to the computer;
an engine rotation sensor (10) coupled to a rotating shaft of the engine, said sensor being connected to and applying engine rotation signals to the computer,
the computer generating a sequence of control signals (U21) having a predetermined common characteristic in dependence on the signals applied thereto and in accordance with a program stored therein;
at least one output control stage (13, 14) for triggering the event or events to be controlled;
at least one auxiliary control device (17, 18) connected to the engine rotation sensor (10) and receiving the engine rotation signals;
a controllable switching device (12) having its output connected to the input of the at least one output control stage (13, 14) and inputs, respectively, connected to the output of the computer (11) and to the auxiliary control device, or devices (17, 18) and operative to selectively switch the outputs to one of the inputs;
an error decoding stage (19) connected to the computer (11) and receiving output signals from the computer,
said error decoding stage (19) controlling the controllable switching device (12) to connect the respective output control stage to the associated auxiliary control device (17, 18) and disconnect the circuit path from the computer (11) to said output control stage upon detection of a computer malfunction or operatig error:
wherein the error decoding stage includes
means (29) for generating a signal sequence having a characteristic which is similar to said predetermined characteristic; and
a retriggerable timing and comparison element (22-28) connect to and comparing the relative relationship of the characteristic of the signal sequence from said sequence generating means (29) with the predetermined characteristic of the control signals received from the computer and providing an "error" output if the characteristics of the signal sequence and the control signals from the computer do not have a predetermined relationship to thereby provide an output indication of computer malfunction or operating error.

2. Apparatus for controlling repetitive events dependent upon operating parameters of a vehicular internal combustion engine, and including at least one of: ignition events; fuel injection events; transmission events, comprising
a vehicular computer (11);
means (11a, 11b) applying vehicle operating signals to the computer;
an engine rotation sensor (10) coupled to a rotating shaft of the engine, said sensor being connected to and applying engine rotation signals to the computer,
the computer generating a sequence of control signals in dependence on the signals applied thereto in accordance with a program stored therein in which each of said control signals (U21) has a predetermined pulse duration during normal operation of the computer;
at least one output control stage (13, 14) for triggering the event or events to be controlled;
at least one auxiliary control device (17, 18) connected to the engine rotation sensor (10) and receiving the engine rotation signals;
a controllable switching device (12) having its output connected to the input of the at least one output control stage (13, 14) and inputs, respectively, connected to the output of the computer (11) and to the auxiliary control device, or devices (17, 18) and operative to selectively switch the output to one of the inputs;
an error decoding stage (19) connected to the computer (11) and receiving output signals from the computer,
said error decoding stage (19) controlling the controllable switching device (12) to connect the respective output control stage to the associated auxiliary control device (17, 18) and disconnect the circuit path from the computer (11) to said output control stage upon detection of a computer malfunction or operating error;
a source (29) of clock signals (U29);
a retriggerable timing element connected to and controlled by said source of clock signals (U29) and establishing a timing duration or holding time, based on the repetition rate of said clock signals, which is longer than said predetermined pulse duration of the control signals (U21) from the computer (11);
and a comparator (28, R) comparing the relative timing relationships of the control signals from the computer (11) and the timing duration, or holding time established by the retriggerable timing element each time a control signal from the computer is received if said relationship is at a predetermined value indicative of normal operation of the computer, said comparator providing an "error" output upon determining that the timing relationships of the control signals (U21) from the computer (11) and the timing duration or holding time of the retriggerable timing element (22-27) has shifted such that the signals from the computer exceed said predetermined timing duration or holding time.

3. Apparatus according to claim 2, wherein the controllable switching device comprises a multiplexer.

4. Appararus according to claim 2, further including an error indicator (20) connected to the error decoding stage and furnishing an error output indication if the error decoding stage determines that the signals applied thereto from the computer (11) are improper.

5. Apparatus according to claim 1, wherein the controllable switching device comprises a multiplexer.

6. Apparatus according to claim 1, further including an error indicator (20) connected to the error decoding stage and furnishing an error output indication if the error decoding stage determines that the signals applied thereto from the computer (11) are improper.

7. Apparatus according to claim 1, wherein said common characteristic is the time duration of pulses or pulse gaps from the computer (11);

and said retriggerable timing and comparison element (22-28) includes a timing circuit (22-27) and a comparator (28) comparing the relative relationship of said time duration of the signals from the computer (11) with a timing sequence generated by said timing circuit under control of the sequence generating means (29), and generating the "error" output if said relative relationship changes from a predetermined value.

8. Apparatus according to claim 7, wherein the signal sequences generated by the signal sequence generating means comprises a clock signals (29) having a clock frequency which is shorter than the timing duration of the control signals from the computer (11);

and said retriggerable timing circuit (22-27) establishes a timing duration under control of a plurality of said clock signals, the comparator comparing the relative relationship of the generated timing duration with control signals (U21) from the computer.

9. Apparatus according to claim 8, wherein the control signals from the computer extend for a time interval spanning a plurality of clock signals, followed by a control signals gap occuring in synchronism with a clock signal gap if the computer is functioning properly, occurrence of signals longer than said plurality of clock signals changing the relative and gaps relationship of occurrence of the respective control signals (U21) and clock signals (U29), and causing the comparator (28) to provide said "error" output.

10. Apparatus according to claim 2, wherein the clock signals (U29) occur at a rate which is faster than the rate of recurrence of the control signals (U21) from the computer to result in computer control signals which span a plurality of clock signals;

and wherein the comparator compares the actual number of clock signals (U29) occurring during the occurrence of the control signal (U21) from the computer and provide said "error" output if the relationship of the number of clock signals occurring during the occurrence of the control signal is beyond a predetermined number.

11. Apparatus according to claim 8, wherein said retriggerable timing circuit (22-27) comprises a flip-flop chain having a plurality of stages, and said retriggerable timing circuit (28) comprises a counter (28) controlled by the clock signals (U29).

12. Apparatus according to claim 2, wherein said retriggerable timing element (22-27) comprises a flip-flop chain having a plurality of stages, and said comparator (28) comprises a counter (28) controlled by the clock signals (U29).

* * * * *